United States Patent [11] 3,580,111

| [72] | Inventor | Joseph M. Tyrner |
| | | Brookside, N.J. |
| [21] | Appl. No. | 818,607 |
| [22] | Filed | Apr. 23, 1969 |
| [45] | Patented | May 25, 1971 |
| [73] | Assignee | Allied Chemical Corporation |
| | | New York, N.Y. |

[54] CAM-CONTROLLED INDEXING DEVICE
6 Claims, 10 Drawing Figs.

| [52] | U.S. Cl. | 74/817 |
| [51] | Int. Cl. | B23b 29/00 |
| [50] | Field of Search | 74/817, |
| | 820, 822, 55, 88, 112, 126; 141/191 (Inquired) | |

[56] References Cited
UNITED STATES PATENTS
| 2,660,895 | 12/1953 | Waters | 74/822X |
| 3,473,417 | 10/1969 | Peterson | 74/820 |

*Primary Examiner*—Fred C. Mattern, Jr.
*Assistant Examiner*—F. D. Shoemaker
*Attorney*—Jon Plaut

ABSTRACT: This application relates to cam-controlled indexing devices. The subject indexing device includes a rotatable indexing wheel perpendicularly mounted on a driven shaft and having cam rollers thereon equispaced alternately on opposite sides of said wheel at a constant radial distance from said driven shaft. The indexing wheel is driven by a cam drive comprising as oscillating sector cam having a groove therein and pivotably mounted adjacent said indexing wheel and for irreversible serial engagement with said cam rollers.

INVENTOR.
JOSEPH M. TYRNER

BY

ATTORNEY

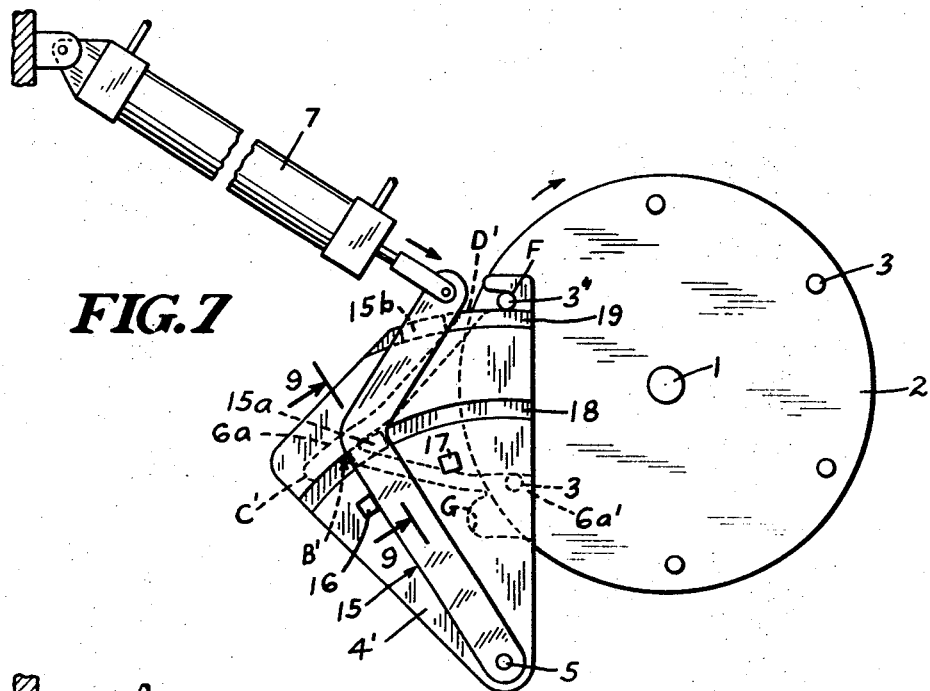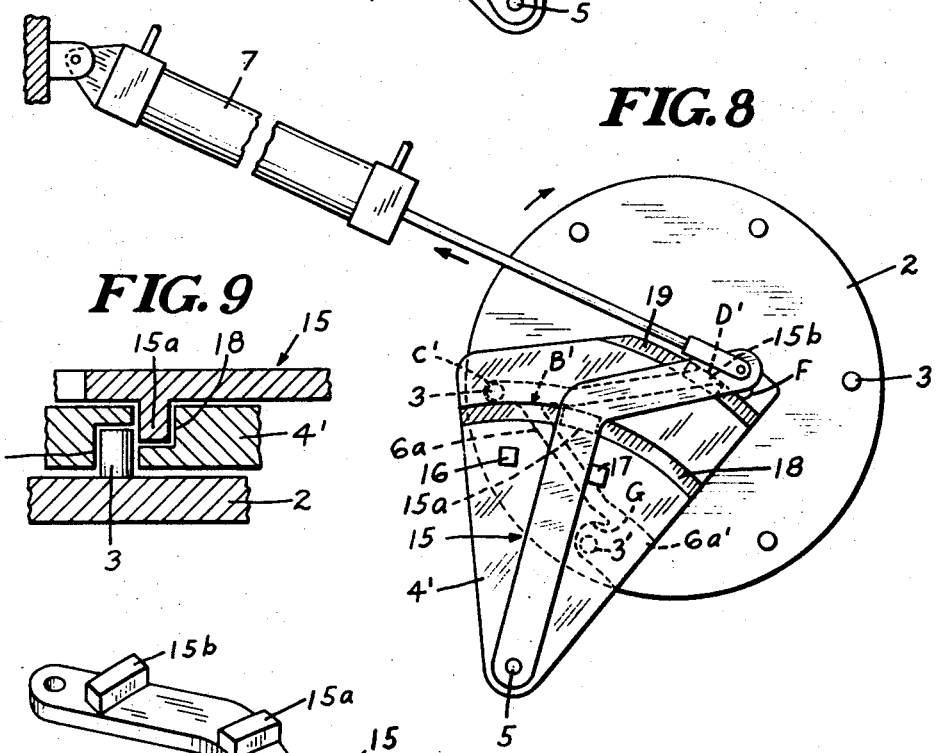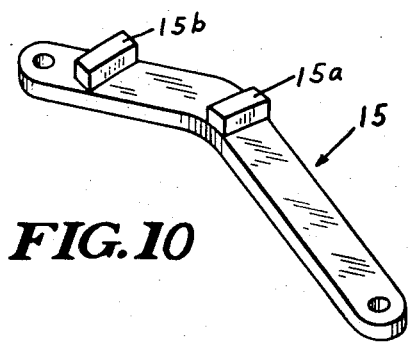

3,580,111

CAM-CONTROLLED INDEXING DEVICE

BACKGROUND OF THE INVENTION

This application relates to the field of indexing devices of the type used, for example, in apparatus such as turret lathes, automatic-bottling machinery and similar automated production machinery.

Such automated production machinery frequently uses a rotating table or drum on which a workpiece is intermittently moved in sequence from one operating station to the next station. While at a standstill in the station, the workpiece is, for example, machined, filled, sterilized or otherwise operated upon.

The intermittent sequential movement of the table is called indexing, the time spent at standstill at the station is called dwell time and the move from one station to the next station is called transfer. A good indexing device must relocate the workpiece accurately during indexing and hold it securely during dwell time. The transfer should be fast, but must be smooth and without jerking with well controlled acceleration and deceleration. It is also desirable that the dwell time be adjustable.

This invention relates more particularly to indexing devices for use in automatic-bottling and -canning machinery. In such applications, in addition to the features mentioned above, it is desirable that indexing devices be as simple as possible, be easy to clean and desirably be made from stainless steel to facilitate maintenance of aseptic conditions.

Two major groups of indexing devices are known in the art. The first type uses a rotating or drum-type cam which indexes a shaft having cam followers mounted thereon. A more detailed description of this type of indexing device appears at page 136 of the Dec. 7, 1967 issue of Machine Design magazine. This system has the advantage that it permits accuracy of position during dwell time and smooth jerk-free transfer. However, it has the disadvantage that, unless an extremely large cam is used it must be disengaged from the follower during the desired dwell period to permit a dwell period of sufficient length to be useful. The use of such engaging and disengaging equipment complicates the machinery required for the device.

A second type of indexing mechanism comprises an intermittently engaging rack and gear, powered for example by an air cylinder. A more detailed description of this type of indexing device appears in bulletin T–11–F Sept. 1965, 10M of Allenair Corporation, 255 East Second Street, Mineola, New York 11502. Again the intermittent engagement requires engaging and disengaging machinery, and in this type of indexing device locking means are necessary to achieve accurate positioning. Such locking means also complicate the design of the indexing device.

It is an object of this invention to provide an indexing device of such simple design as to facilitate the maintenance of aseptic conditions in food-processing machinery such as bottling equipment.

Other and further objects of this invention will be obvious to those skilled in the art from examination of the following specification, drawings, and claims.

SUMMARY OF THE INVENTION

The instant invention relates to indexing devices of the type wherein a workpiece is moved through a sequence of positions by a driven rotor having a plurality of cam bearing means fixed at a constant distance from the rotor's axis, each being equispaced from its neighbor. More particularly, the instant invention relates to indexing devices utilizing oscillatable sector cams having suitable camming surfaces and pivotably mounted for serial engagement with said cam-bearing means. Means for causing said sector cams to oscillate, thereby causing engaged bearings to move in such manner as to index said rotor, include activators such as an air cylinder.

In a preferred embodiment of the instant invention, the camming surface of said sector cam is a continuous concentric groove having suitably positioned therein means for biasing an engaged cam bearing forwardly along the path of said groove.

In another preferred embodiment of the subject invention a workpiece is moved irreversibly through a sequence of positions by utilizing a driven rotor in combination with a cam drive comprising an oscillatable sector cam having a camming surface and straight surface, said camming surface including a continuous groove with at least two dwell points, and said straight surface having a plurality of lateral grooves for slidable movement of an auxiliary cam laterally across said straight surface. The sector cam is pivotably mounted adjacent said rotor for serial engagement with cam bearings mounted on said rotor. An oscillatable auxiliary cam is pivotably mounted on said sector cam straight surface and parallel thereto for the same axis of oscillation, said auxiliary cam having thereon two lateral flanges engaging and complementary with the lateral grooves on the sector camming surface. Two shoulders are mounted interiorly of the straight surface to limit the angle of oscillation of said auxiliary cam. Means for oscillating said sector cam and said auxiliary cam about their common axis of oscillation are mounted on said auxiliary cam.

This invention will be more particularly described by reference to the following drawings.

BRIEF DESCRIPTION OF THE DRAWINGS

FIGS. 7 and 8 are detailed views of a preferred sector cam utilizing an auxiliary cam to assure forward movement of a cam bearing along the camming surface.

FIG. 9 is a cross section view, taken at point B' of FIG. 8, showing the placement of a lateral flange on the camming surface.

FIG. 10 is a detail view of a preferred auxiliary cam having two lateral flanges.

DESCRIPTION OF THE PREFERRED EMBODIMENT

Figure 1:
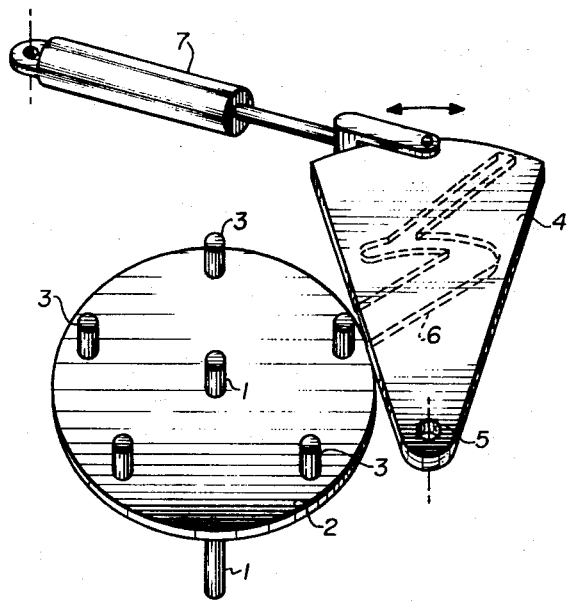
FIG. 1 is a perspective view of a preferred embodiment of this invention.

Referring now more particularly to FIG. 1, which is a perspective view of the preferred embodiment of this invention, reference numeral 2 denotes a rotatable indexing wheel perpendicularly mounted on driven shaft 1. The mounted wheel is hereinafter referred to more broadly in the specification and claims as a rotor. Cam bearings 3 are equispaced alternately on opposite sides of wheel 2 at a constant radial distance from driven shaft 1. Sector cam 4 is pivotably mounted about a point 5, and in parallel alignment with and adjacent to indexing wheel 2 for serial engagement with cam bearings 3. Reference numeral 6 indicates the slotted camming under surface of sector cam 4, said slot being the path of travel of an engaged cam bearing 3 for indexing a workpiece to a new position. Double acting air cylinder 7, supplied with air by conventional means (not shown), causes sector cam 4 to oscillate back and forth as shown by the arrows. This oscillating motion causes groove 6 to engage cam bearing 3 and thus causes indexing wheel 2 to rotate and index shaft 1.

Figure 2:
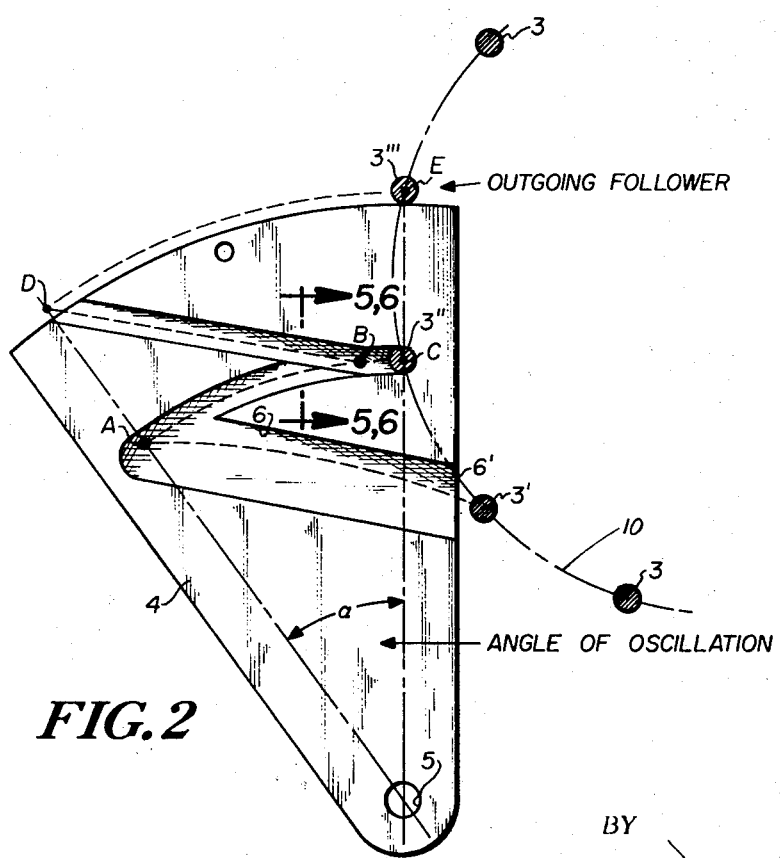
FIG. 2 is a detail view of element 4 of FIG. 1, showing its relationship to the bearings mounted on the rotatable indexing wheel.

Referring more particularly to FIG. 2, which is a detail view of the sector cam of this invention, showing its relationship to the cam bearings or followers mounted on the indexing wheel, reference numeral 10 indicating the dashed line that marks the path of followers 3 along the camming surface. This detailed view is more particularly a view of the bottom surface or camming surface of element 4 of FIG. 1. The several followers in various positions on this FIG. have been denoted 3, 3', 3'', 3'''. Reference numeral 4 indicates the sector cam having an angle of oscillation about point 5. As sector cam 4 is oscillated to the right, follower 3' is engaged by groove 6 at its entrance 6'. As cam 4 continues its move to the right, follower 3' is moved to point A on cam 4. As cam 4 oscillates back to the left, follower 3' moves to point C; as cam 4 oscillates back to the right follower 3' moves to point D, and finally as cam 4 oscillates back to the left, follower 3' moves to point E from which point it moves away from the cam as indicated by follower 3 above the cam, wheel 2 being indexed in the clockwise direction.

At any given time there are three followers closely engaged with the cam. Each of these followers takes the path described in the previous paragraph. The three followers associated with the cam of FIG. 2 are 3' which is about to enter groove 6, 3'' which is at the halfway point C of its engagement with cam 4, and 3''' which is at the end point E of its engagement with cam 4.

Figure 3:
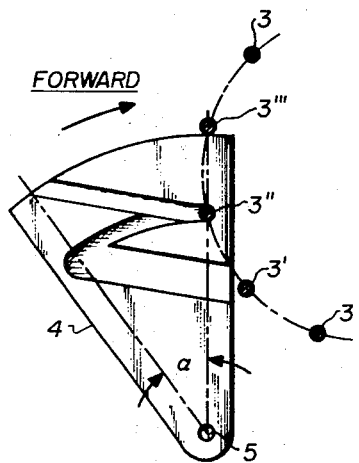
FIGS. 3 and 4 show the position of the cam bearings on the rotatable indexing wheel for both the forward and return strokes, respectively, of the oscillating cam.
Figure 4:
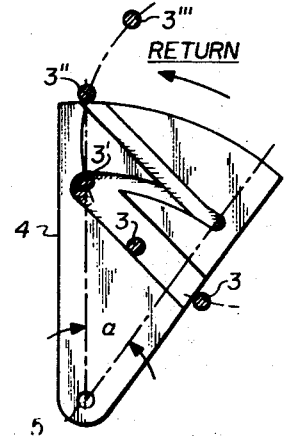

FIGS. 3 and 4 show, in a somewhat schematic form, the position of the followers on the disc at the beginning of both the forward and return strokes of oscillating cam 4. The reference numerals are the same as those used in FIG. 2. The passage of the various followers through the cam is clearly illustrated in these FIGS.

Figure 5:
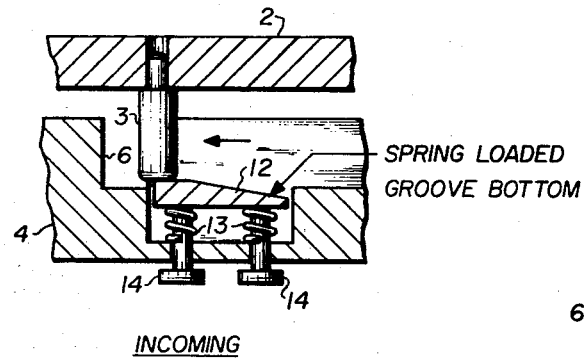
FIGS. 5 and 6 are cross section views, taken on the line 5–5, of FIG. 2, showing the spring-loaded groove bottom of the sector cam of this invention.
Figure 6:
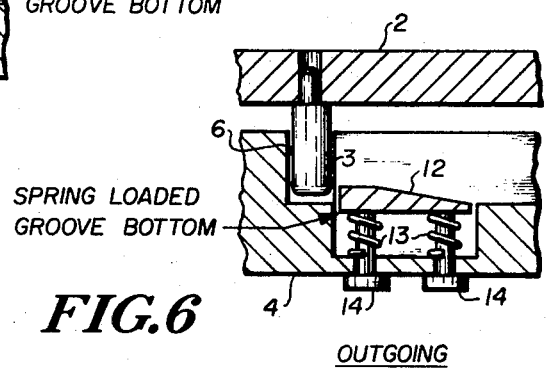

FIGS. 5 and 6 are cross section views, taken on the line 5–5 of FIG. 2, showing the spring-loaded groove bottom of the sector cam of this invention. As a follower 3 passes from point A to point C of FIG. 2, point C being hereinafter referred to as a dwell point, it passes over a portion of the path designated B—C. Thereafter, the follower 3 continues its path from point C to point D. In so doing, it retraces its path from point C to point D. In order to prevent the follower from going back to point A rather than on to point D, a spring-loaded groove bottom is provided at point B. On FIGS. 5 and 6, reference numeral 2 denotes wheel 2, reference numeral 3 indicates a follower, reference numeral 6 indicates the camming groove and reference numeral 4 indicates the cam. FIG. 5 illustrates the movement of follower 3 as it moves from point A to point C. When the follower 3 reaches point B it pushes over a spring-loaded groove bottom 12, on its way toward point C. This is depicted in FIG. 5, with the arrow indicating the movement of follower 3. FIG. 6 depicts the follower 3 as it moves from point C to point D. As the follower 3 reaches point B (it has already retraced its path from point C to point B) it is blocked from moving back to point A by the g groove bottom 12. Instead the follower 3 is constrained to follow the path to point D. The groove 6 between point B and point D is indicated in FIG. 6 by the plane of the paper. The spring-loaded groove bottom 12 is biased upwardly in FIGS. 5 and 6, by springs 13 mounted on headed bearings 14, said bearings being slidably mounted in the sector cam. In a preferred use of the subject invention, as shown in FIG. 1, the camming surface is the bottom surface of sector cam 4; therefore, in a preferred use the spring-loaded groove bottom is biased downwardly.

The spring-loaded groove bottom of FIGS. 5 and 6 as applied to its preferred use as in FIG. 1 comprises two headed bearings slidably mounted in the camming groove at point B, tapered section 12 being mounted on the bearings. Tapered section 12 is biased downwardly in substantial alignment with the camming groove for engagement with an engaged cam bearing moving forwardly through the camming groove, the cam bearing urging the tapered section upwardly for continued free passage through the groove. The surface of the tapered section adjacent dwell point C of FIG. 2 projects downwardly to prevent the cam bearing from retracing its path over the tapered section to point A of FIG. 2. Helical springs 13 engage and encompass each bearing 14 and bias tapered section 12 downwardly.

Referring to FIGS. 7 through 10, the embodiment of a preferred sector cam there shown includes an oscillatable auxiliary cam subassembly pivotably mounted on the straight surface of the sector cam for limited slidable movement on the sector cam straight surface.

In FIGS. 7 and 8, oscillatable sector cam 4' pivotably mounted about point 5, has a straight surface and a camming surface. The straight surface includes lateral grooves 18 and 19 for slidable movement of auxiliary cam 15 laterally across the straight surface. The camming surface comprises groove 6a having dwell points C' and F positioned in said surface, said groove 6a serially engaging cam bearing means 3 at groove lip 6a'.

Angulate oscillatable auxiliary cam 15 having lateral flanges 15a and 15b, as shown in FIG. 10, is pivotably mounted on the straight surface about point 5 for slidable movement on said straight surface. Flanges 15a and 15b respectively engage complementary lateral grooves 18 and 19. Two shoulders mounted interiorly of the straight surface at points 16 and 17 limit the angle of oscillation of auxiliary cam 15 on the straight surface.

Double-action air cylinder 7 pivotably mounted on auxiliary cam 15 by conventional means oscillates auxiliary cam 15 by conventional means oscillates auxiliary cam 15 thereby causing sector cam 4' to oscillate back and forth as auxiliary cam 15 intermittently engages shoulders 16 and 17. FIG. 7 shows the position of the sector cam and auxiliary cam assembly as cylinder 7 is about to initiate clockwise motion of said assembly causing groove 6a to engage cam bearing 3. The direction of movement of auxiliary cam 15 moves in the direction of arrow 9, indicated in FIG. 7, the auxiliary cam engages shoulder 17 and causes sector cam 4' to move in the clockwise direction in such manner as to cause groove 6a to engage cam bearing 3 causing wheel 2 to index shaft 1 as heretofore described.

Referring more particularly to FIG. 7, which is a view of the top surface or straight surface of the cam assembly, cam bearing 3 enters groove 6a at lip 6a'. When auxiliary cam 15 engages shoulder 17 for clockwise movement of sector cam 4', cam bearing 3 travels along groove 6a to dwell point C' where the cam bearing rests at the end of the clockwise stroke. As the auxiliary cam engages shoulder 17, cam bearing 3'', engaged by groove 6a during the prior clockwise movement of auxiliary cam 15, retraces its path over an area FD', F being a second dwell point, as it is disengaged from sector cam 4'. In order to prevent cam bearing 3'' from retracing its path to point C', the oscillation stroke is so timed and shoulder 17 so positioned that flange 15b of auxiliary cam 15 is aligned and engaged adjacent groove outlet point D'.

Referring to FIG. 8, which is illustrative of the cam assembly of FIG. 7 initiating a counterclockwise stroke, wherein cylinder 7 drives auxiliary cam 15 into engagement with shoulder 16 causing concomitant counterclockwise movement of sector cam 4'. Detent point G forms a seat for cam bearing 3' brought into contact with sector cam 4' by the clockwise motion of the previous stroke as illustrated in FIG. 7. As auxiliary cam 15 engages shoulder 16, cam bearing 3 is caused to travel along path C'D'F in groove 6a. Cam bearing 3 retraces its path over an area C'B' as it leaves dwell point C'. In order to prevent cam bearing 3 from retracing its path to groove lip 6a', the oscillation stroke is so timed and shoulder 16 so positioned that flange 15a of auxiliary cam 15 is aligned and engaged with groove 6a adjacent point B' as cam bearing 3 passes point B'.

FIG. 9 is a detail showing the feature of FIG. 8 which prevents cam bearing 3 from retracing its path to lip 6a at point B'. As cam bearing 3 passes point B' flange 15 is aligned adjacent point B in lateral groove 18 causing partial closure of the return path to lip 6a'. Similarly the same detail can be applied to FIG. 7 to show the irreversible cam bearing feature therein described above.

FIG. 10 is a bottom view in perspective of an auxiliary cam of this invention. As herein shown, auxiliary cam 15 is angulate to accommodate the particular camming groove 6a herein described and causes the irreversible cam bearing feature to be effective. The design of the auxiliary cam can be varied to accommodate camming grooves of varied shapes. The number of flanges and their position on the auxiliary cam can also be varied in accordance with the number and placement of points in the camming surface where a cam bearing can retrace its path.

Although this invention has been described with particular reference to specific embodiments, it is to be understood that it is not to be limited thereto but is to be construed broadly and restricted solely by the scope of the appended claims.

What I claim is:

1. In combination with an indexing device of the type wherein a workpiece is moved through a sequence of positions by a driven rotor having a plurality of cam bearing means fixed at a constant distance from the rotor's axis, each being equispaced from its neighbor, the improvement which comprises:
   a. an oscillatable sector cam having a camming surface and pivotably mounted for serial engagement with said cam-bearing means; and
   b. means for oscillating said sector cam through an angle mounted on said sector cam, each oscillation causing an engaged follower to move in such manner as to index said rotor.

2. The indexing device of claim 1 wherein the camming surface is a continuous groove and the means for oscillating the sector cam is an air cylinder.

3. The indexing device of claim 2 wherein the camming groove has at least one dwell point having a means for biasing an engaged cam-bearing means forwardly along the path of said groove.

4. The indexing device of claim 3 wherein the biasing means is a spring-loaded groove bottom which comprises:
   a. at least one bearing slidably mounted in the camming groove;
   b. a tapered section mounted on said bearing and biased downwardly in substantial alignment with said camming groove for engagement with an engaged cam-bearing means moving forwardly through said camming groove, said cam-bearing means urging said tapered section means upwardly for continued free passage through said groove the surface of said tapered section adjacent said dwell point projecting downwardly to prevent said cam-bearing means from retracing its path over said tapered section; and
   c. a helical spring engaging and encompassing each bearing for biasing said tapered section downwardly.

5. In combination with an indexing device of the type wherein a workpiece is moved irreversibly through a sequence of positions by a driven rotor having a plurality of cam-bearing means fixed at a constant distance from the rotor's axis, each being equispaced from its neighbor, the improvement which comprises:
   a. an oscillatable sector cam having a camming surface and a straight surface, said camming surface having at least one dwell point including a continuous groove for engaging said cam-bearing means, and said straight surface having thereon two lateral grooves for slidable movement of an auxiliary cam laterally across said straight surface and said sector cam being pivotably mounted for serial engagement with said cam-bearing means;
   b. an oscillatable auxiliary cam having two lateral flanges thereon engaging and complementary with said lateral grooves and said auxiliary cam being pivotably mounted on said sector cam and about the same axis of oscillation as said sector cam;
   c. two shoulders mounted interiorly of said straight surface and limiting the angle of oscillation of said auxiliary cam on said straight surface; and
   d. means for oscillating said sector cam and said auxiliary cam about their common axis of oscillation, said oscillating means being mounted on said auxiliary cam.

6. The indexing device of claim 5 wherein the means for oscillating said auxiliary cam is an air cylinder.